Figure 1:
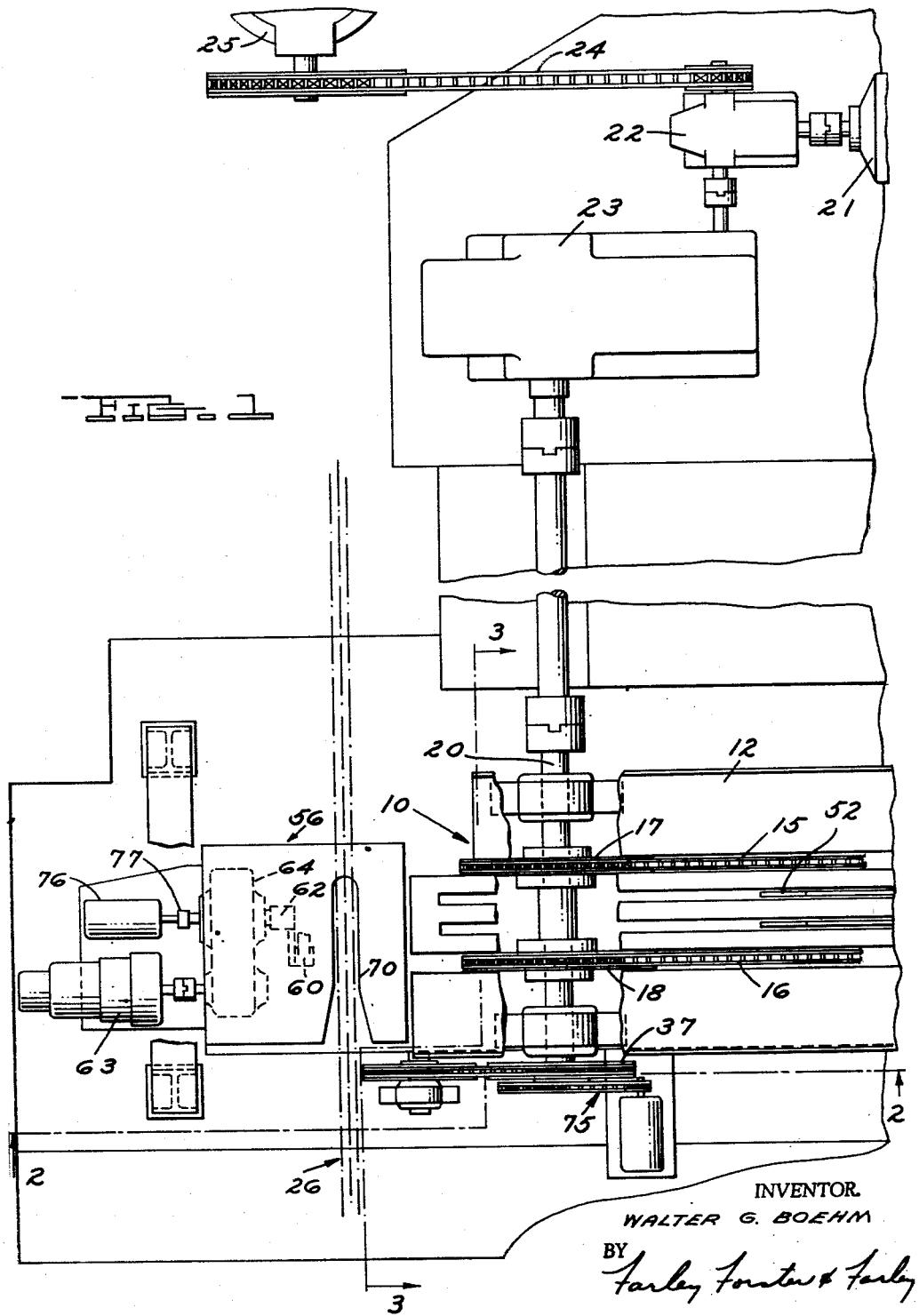

Sept. 29, 1964  W. G. BOEHM  3,150,759
TRANSFER APPARATUS FOR COIL CONVEYORS AND THE LIKE
Filed April 13, 1962  4 Sheets-Sheet 1

INVENTOR.
WALTER G. BOEHM
BY
*Farley, Forster & Farley*
ATTORNEYS

Sept. 29, 1964 W. G. BOEHM 3,150,759
TRANSFER APPARATUS FOR COIL CONVEYORS AND THE LIKE
Filed April 13, 1962 4 Sheets-Sheet 2

INVENTOR.
WALTER G. BOEHM
BY Farley Forster & Farley
ATTORNEYS

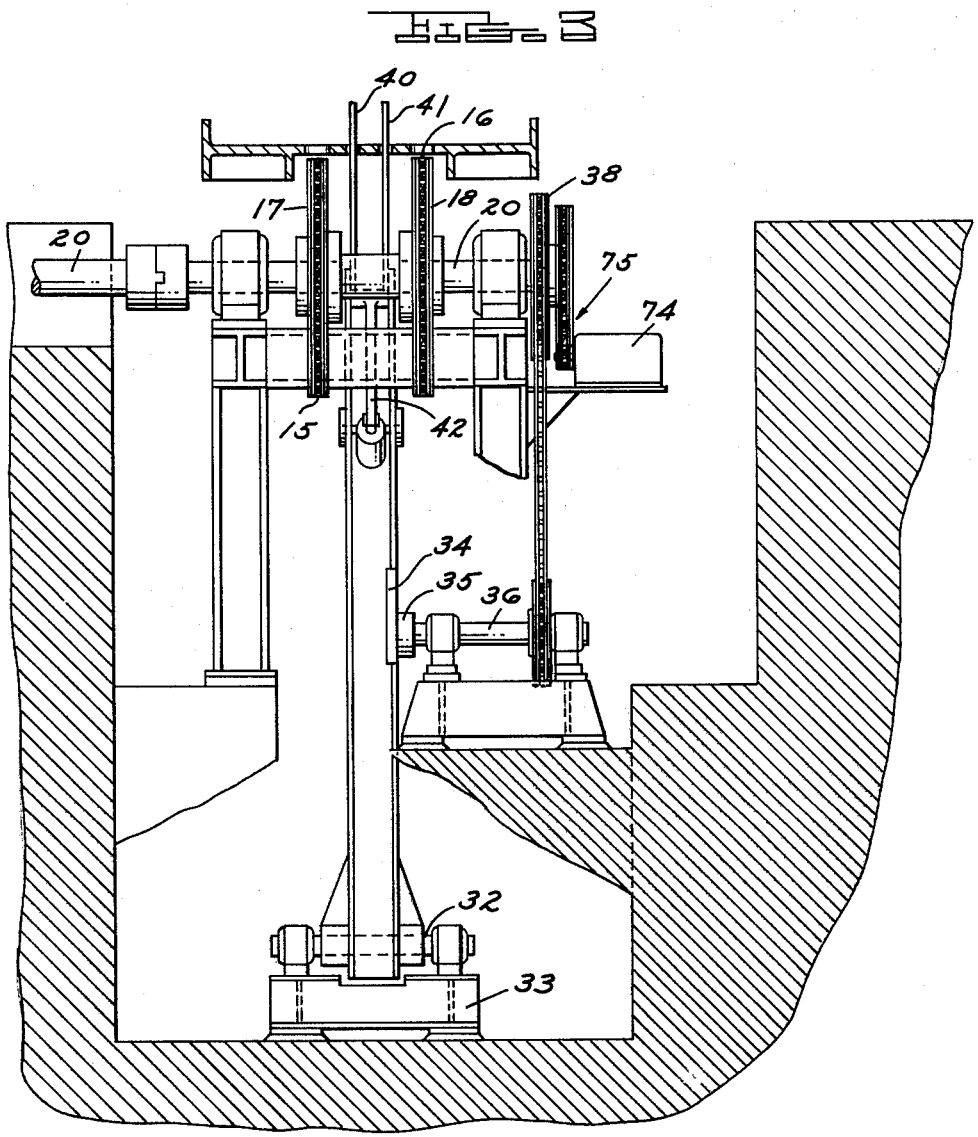

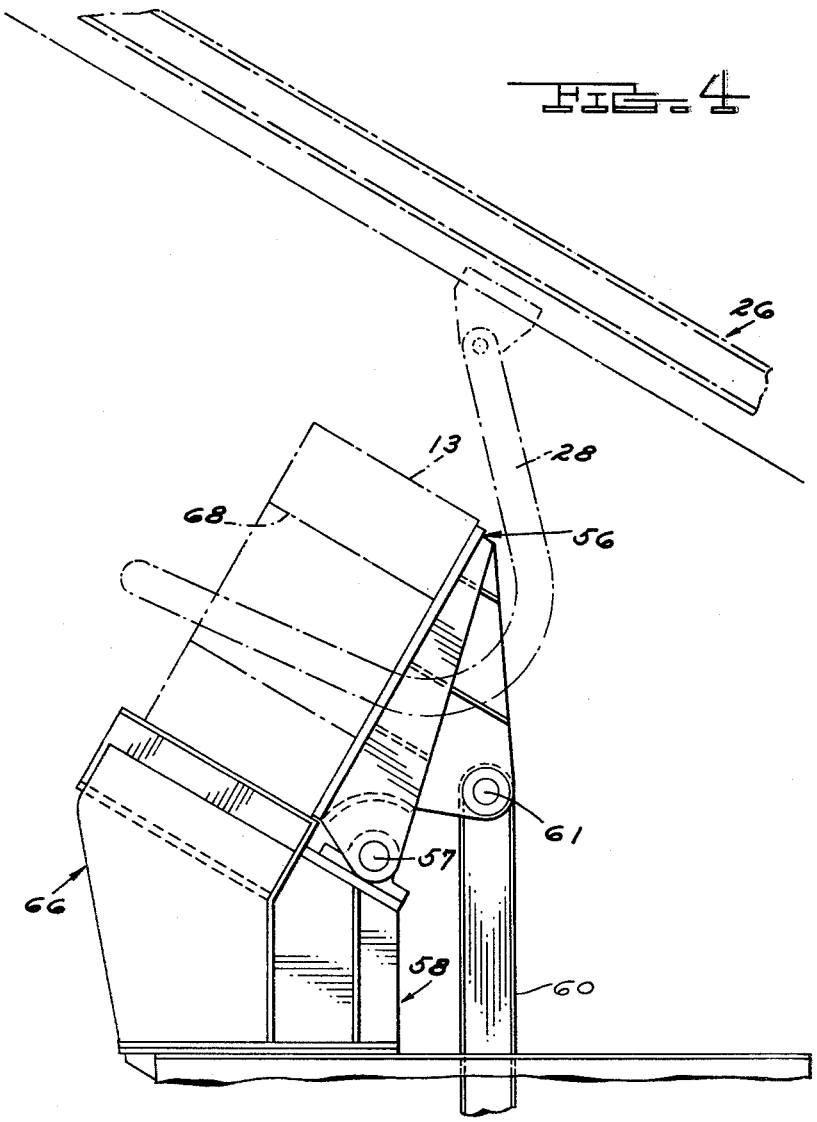

United States Patent Office 3,150,759
Patented Sept. 29, 1964

3,150,759
TRANSFER APPARATUS FOR COIL CONVEYORS AND THE LIKE
Walter G. Boehm, Birmingham, Mich., assignor to Jervis B. Webb Company, Detroit, Mich., a corporation of Michigan
Filed Apr. 13, 1962, Ser. No. 187,360
3 Claims. (Cl. 198—27)

This invention relates to improvements in the construction, arrangement and control of apparatus for transferring objects such as coils of steel wire or rod off the end of a drag conveyor, or from a drag conveyor to an overhead conveyor through a tilt table.

A conventional drag conveyor includes an article supporting surface or bed through which moving pusher members project into engagement with an article for advancing it along the bed to the head or discharge end of the conveyor, these pusher members being usually attached to a chain which travels in a vertical endless path, passing around a driving sprocket at the head end of the conveyor. As the chain passes around the drive sprocket, the pusher members move from above to below the conveyor bed, conveying action stops, and when an article such as a coil of rod or wire is being handled, the coil can easily become disarranged or damaged due to the scuffing action between the coil and the pusher members as they move from above to below the bed out of driving engagement. An auxiliary pusher device, or transfer arm, has been employed at the head end of a drag conveyor to engage the lead coil and move it ahead at a faster rate, thereby increasing the spacing between the lead and next following coils and gaining time for the transfer operation. Such a pusher device advances the article off the head end of the drag conveyor, either onto another conveyor or some other handling apparatus such as a tilt table for transferring the article to another conveyor.

The present invention is concerned with an improved transfer apparatus of this type. Increased production rates have created difficulties in providing transfer apparatus which can be satisfactorily operated at the increased conveyor speeds required to keep pace therewith, and further difficulties in synchronizing the operation of the transfer apparatus with the more rapidly moving conveyor members with which it is associated.

Accordingly, the general object of the present invention is to provide transfer apparatus for use in conjunction with a drag type conveyor which is operative to engage and advance successive articles off the head end of the drag conveyor without damage thereto. A further object is to provide a combination of such transfer apparatus with a device such as a tilt table in order to transfer objects off the head end of a drag conveyor and onto an adjacent overhead conveyor together with an improved arrangement of driving means and controls therefor which permit the apparatus to be readily and accurately synchronized for operation at increased rates of speed.

The apparatus provided by the invention for use in combination with a drag conveyor in order to advance successive articles off the head end thereof comprises a transfer arm pivotally supported beneath the head end of the drag conveyor, and oscillated on transfer and return strokes in synchronism with movement of the drag conveyor by drive means operated from the drag conveyor drive unit. An article engaging pusher member is mounted on the upper end of the transfer arm for movement between a driving position in which a portion of the pusher member projects above the drag conveyor bed and a non-driving position in which the pusher member is retracted below the drag conveyor bed, and a fluid pressure cylinder carried by the transfer arm is provided for moving the pusher member between these positions. Actuation of the fluid pressure cylinder is controlled by a device driven in synchronism with the transfer arm so as to be operable to precisely produce movement of the pusher member to driving position by the fluid pressure cylinder at the beginning of a transfer stroke of the transfer arm and movement of the pusher member to non-driving position as the transfer arm approaches the end of a transfer stroke. The pusher member is preferably pivoted to the upper end of the transfer arm and includes a crank portion operatively connected to the fluid pressure cylinder.

When combined with transfer apparatus such as a tilt table, the arrangement of the invention provides an independent driving unit for moving the tilt table between a substantially horizontal position in alignment with the head end of the drag conveyor and an inclined position. Operation of this independent drive unit is controlled in part by the same device which acts to control operation of the fluid pressure cylinder, this device acting to start the tilt table drive motor, and a second control device driven by the tilt table drive unit acts to stop this drive motor each time the tilt table is moved from one of its positions to the other.

Figure 2:
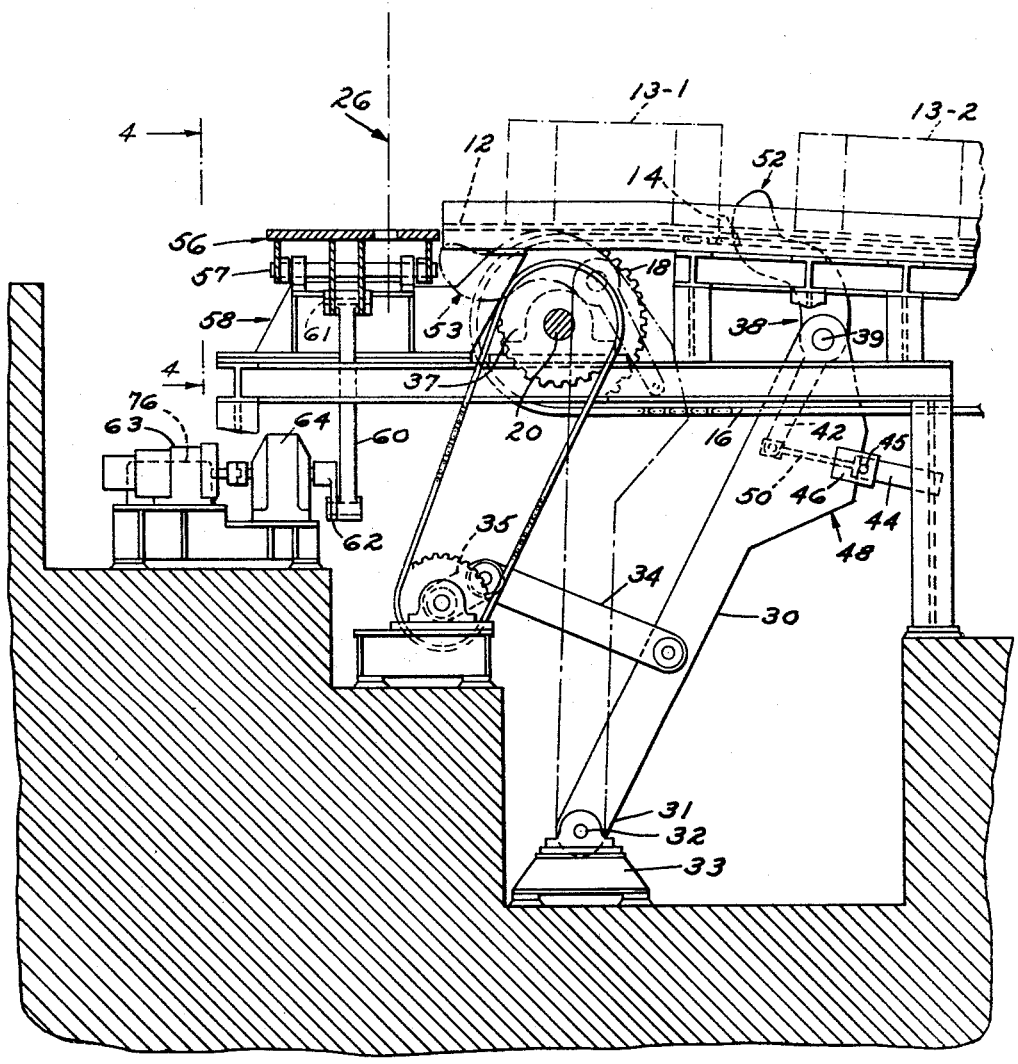

The overall arrangement which results permits the transfer of articles at increased rates without damage, permits precise synchronization of the various transfer movements with increased ease of adjustment of these movements, particularly in initially setting up the apparatus, and provides apparatus which is relatively simple in construction. These, together with other features and advantages of the invention will be further brought out in the following description of the presently preferred representative embodiments shown in the accompanying drawings which include the following views:

FIGURE 1, a plan view showing the head end of a drag conveyor, a tilt table mounted adjacent thereto and driving mechanism for the various components illustrated;

FIGURE 2, a sectional elevation taken as indicated by the line 2—2 of FIG. 1;

FIGURE 3, a transverse or sectional end elevation taken as indicated by the lines 3—3 of FIG. 1;

FIGURE 4, a fragmentary enlarged end elevation, partly schematic, taken as indicated by the line 4—4 of FIG. 2; and FIGURE 5, a diagram illustrating the various operations involved in a transfer cycle and their relative time sequence.

Referring to FIGS. 1–3, the head end 10 of a conventional drag conveyor is illustrated, this conveyor including an article supporting surface or bed 12 along which articles such as wire coils 13 are moved by spaced pairs of pusher members 14 secured to a pair of propelling chains 15 and 16 which are respectively trained about driving sprockets 17 and 18 at the head end 10. Sprockets 17 and 18 are secured to a drive shaft 20 which is driven from a motor 21 (FIG. 1) through gear boxes 22 and 23, gear box 22 also serving to drive through a chain 24 the reducer 25 of the drive unit of an overhead chain conveyor 26, schematically shown in FIG. 4. The transfer apparatus to be described operates to advance each article 13 off the head end 10 of the drag conveyor and place it in position for engagement by a hook 28 of the overhead conveyor 26 as illustrated in FIG. 4.

This transfer apparatus includes a transfer arm 30 having its lower end 31 pivoted at 32 to a suitable support 33 mounted beneath the head end of the drag conveyor. The transfer arm 30 is oscillated about the pivot 32 on transfer and return strokes between the approximate positions shown in full line and in phantom in FIG. 2 by a connecting rod 34 and crank 35, crank 35 being secured to a crank shaft 36 driven in synchronism with the operation of the drag conveyor from a sprocket 37 secured to the main drive shaft 20. A pusher member 38 is pivoted at 39 between the bifurcated upper end of the transfer arm 30, and includes a pair of upwardly extending pusher portions 40 and 41 and a depending crank arm 42. A fluid pressure cylinder 44 is pivoted at 45 between a pair of mounting plates 46 secured to an enlarged upper portion 48 of the transfer arm, this portion being disposed rearwardly in the direction of article movement along the drag conveyor. The rod 50 of the cylinder 44 is secured to the crank portion 42 of the pusher member, and the fluid pressure cylinder 44 is operative to move the pusher member 38 relative to the transfer arm 30, between the extended or driving position shown in full line in FIG. 2 and indicated by the reference 52 and the retracted or non-driving position 53 shown in dash line.

A tilt table 56 (FIGS. 1, 2 and 4) is mounted adjacent the head end 10 of the drag conveyor for rocking movement about a shaft 57 supported by suitable structure 58. A connecting rod 60 is secured to the table at 61 and to a crank 62 which is driven by an independent drive unit consisting of a motor 63 and reducer 64, the crank 62 being secured to the output shaft of the latter. This tilt table drive unit is operable to move the tilt table between the generally horizontal position shown in FIGS. 1 and 2, in which the table 56 is in substantial alignment with the bed 12 of the drag conveyor, and the inclined position shown in FIG. 4 in which a coil 13 transferred to the table is supported by the table surface and a suitable cradle 66 which also serves to center the coil 13 so that its central opening 68 is aligned with a slot 70 in the table surface.

Fluid pressure cylinder 44 is connected by conventional means (not shown) to a fluid pressure source through a pair of electrical control valves which operate to regulate the admission of pressure to the head and rod ends of the cylinder.

The overall operation of the transfer apparatus is regulated and synchronized by a pair of control devices which are rotary cam limit switch units in the construction shown. The first of these rotary cam limit switch units 74 is mounted alongside the drag conveyor as shown in FIGS. 1 and 3 and is continuously driven by a gear train 75 from the main drive shaft 20. The second cam limit switch unit 76 is directly coupled to the output shaft 77 of the reducer 64 which forms part of the independent tilt table drive unit. Limit switch unit 74 controls the pressure cylinder 44 to regulate the movement of the pusher member between driving and non-driving positions and also controls starting of the motor 63 of the tilt table drive. Limit switch unit 76 acts to stop the tilt table drive each time the crank 62 moves 180 degrees, or in other words, acts to stop the tilt table drive unit each time the table 56 is moved from its receiving position of FIG. 2 to its discharging position of FIG. 4 and from the discharging position back to the receiving position.

Operation of the apparatus can best be appreciated from the following description with reference to FIG. 2 and to the time cycle chart of FIG. 5. In FIG. 2, coil 13-1 has been moved along the drag conveyor bed to a position where a transfer operation is about to take place, transfer arm 30 is just beginning forward movement on a transfer stroke and the fluid pressure cylinder 44 has been actuated through the limit switch unit 74 to move the pusher 38 to driving position, extending the pusher portions 40-41 above the conveyor bed through the slots therein. This operation is illustrated by the cross-hatched block 80 on the first horizontal line of the chart, FIG. 5, and FIG. 2 shows the apparatus in full line an instant after the beginning of a cycle. Each vertical line of the chart represents an interval of time. When the pusher arm reaches the end of a forward or transfer stroke, limit switch unit 74 signals for a starting of the motor 63 of the tilt table drive and the tilt table is moved from the horizontal to the inclined position shown in FIG. 4 in the interval represented by the block 81 on the chart. The tilt table dwells during the interval represented by the block 82 in the inclined position while a hook on the overhead conveyor completes its engagement with coil 13, and this dwell period is accomplished by action of the control device 76 of the tilt table drive which stops the drive motor 63 after the table has moved from the horizontal to the inclined position. Control device 74 again signals to start the tilt table drive motor resulting in the tilt table returning to horizontal position during the interval 83, while simultaneously the coil 13-1 is transferred to the hook of the overhead conveyor.

As soon as the transfer arm reaches the end of a transfer stroke the control device 74 sets up a signal which results in actuation of the fluid pressure cylinder 44 to move the pusher arm 38 to non-driving position below the bed 12 of the drag conveyor, and while the tilt table motions are taking place as described above, the transfer arm oscillates on a return stroke during the interval represented by the block 86. Meanwhile, the drag conveyor has advanced the second coil 13-2 to approximately the position illustrated by coil 13-1 as indicated by the block 88, and as the transfer arm 30 reaches the end of its return oscillation and again begins forward movement, the control limit switch 74 causes actuation of the fluid pressure cylinder 44 to move the pusher members 40-41 to driving position and a new cycle begins.

Use of the fluid pressure actuated pusher member on the transfer arm enables this member to be moved between driving and non-driving positions with greater speed and as one result, coils can be spaced more closely on the drag conveyor. Another result is a simplification of the drive mechanism and a more smooth operation thereof since the main drive mechanism only has to produce a regular oscillating movement of the transfer arm.

Use of an independent drive unit to produce motion of the tilt table between its two positions also contributes to speeding up the operation because this drive unit can be selected and designed for the specific performance of this one operation at an optimum rate.

Use of these independent driving means for the pusher members and the tilt table, when regulated primarily by the continuously driven control device 74 results in greater ease of synchronization of the motion and also more flexibility since the time at which the individual motions take place such as starting of the tilt table and movement of the pusher members between driving and non-driving positions can be regulated merely by a simple adjustment to the control device 74.

While preferred embodiments have been described above in detail, it will be understood that numerous modifications might be resorted to without departing from the scope of my invention as defined in the following claims.

I claim:

1. Apparatus for use in combination with a drag conveyor for advancing successive articles off the head end thereof comprising a transfer arm, means pivotally supporting the transfer arm beneath the head end of the conveyor, drive means for oscillating the transfer arm on transfer and return strokes in synchronism with movement of the drag conveyor, a pusher member mounted on the upper end of the transfer arm for movement between driving and non-driving positions, a fluid pressure actuating cylinder carried by the transfer arm for moving the pusher member, and means including a control device for operating said fluid pressure actuating cylinder, said control device being driven by said drive means and being operable to produce movement of said pusher member to driving position by said fluid pressure actuating cylinder at the beginning of a transfer stroke of the transfer arm and to non-driving position as said transfer arm approaches the end of a transfer stroke.

2. Apparatus for use in combination with a drag conveyor for advancing successive articles off the head end thereof comprising a transfer arm, means pivotally supporting the transfer arm beneath the head end of the conveyor, drive means for oscillating the transfer arm on transfer and return strokes in synchronism with movement of the drag conveyor, a pusher member having an article engaging portion, means connecting the pusher member to the transfer arm for movement relative thereto, a fluid pressure cylinder connected between the pusher member and transfer arm and adapted to move the article engaging portion of the pusher member between a driving position and a non-driving position, and means for controlling actuation of said fluid pressure cylinder to move the pusher member to driving position on a transfer stroke and non-driving position on a return stroke.

3. Apparatus for handling coils from the bed of a drag conveyor to an overhead conveyor including a tilt table positioned at the head end of the drag conveyor and pusher means operable to advance an article from the drag conveyor to the tilt table characterized by said pusher means comprising an arm pivotally supported at its lower end beneath the head end of the drag conveyor with the upper end of the arm terminating below the drag conveyor bed, drive means for oscillating the arm on transfer and return strokes in synchronism with movement of the drag conveyor, a pusher member pivotally secured to the upper end of the arm, fluid pressure actuating means for moving the pusher member between a driving position in which it projects above the drag conveyor bed and a non-driving position in which it is retracted below the drag conveyor bed, independent driving means for moving the tilt table between a substantially horizontal position in alignment with the head end of the drag conveyor bed and an inclined position, and means for synchronizing the operation of said fluid pressure actuating means and said tilt table drive mechanism comprising a first control device, means for driving the first control device in synchronism with oscillating movement of the transfer arm, a second control device, means for driving the second control device in synchronism with the tilt table drive mechanism, the first control device including means for regulating the operation of said fluid pressure actuating means to move the pusher member between driving and non-driving positions and means for starting the tilt table drive mechanism, said second control device including means for stopping the tilt table driving mechanism each time the table is moved thereby from one table position to the other table position.

References Cited in the file of this patent
UNITED STATES PATENTS
2,525,189   Thomas _____ Oct. 10, 1950